(12) United States Patent
Chasser et al.

(10) Patent No.: US 9,631,045 B2
(45) Date of Patent: *Apr. 25, 2017

(54) POLYCARBODIIMIDES HAVING ONIUM SALT GROUPS

(75) Inventors: Anthony M. Chasser, Allison Park, PA (US); Lawrence J. Fitzgerald, Gibsonia, PA (US); Venkateshwarlu Kalsani, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1346 days.

This patent is subject to a terminal disclaimer.

(21) Appl. No.: 12/370,100

(22) Filed: Feb. 12, 2009

(65) Prior Publication Data

US 2010/0204515 A1    Aug. 12, 2010

(51) Int. Cl.
| | | |
|---|---|---|
| C07C 267/00 | (2006.01) | |
| C08G 18/79 | (2006.01) | |
| C08G 18/18 | (2006.01) | |
| C08G 18/02 | (2006.01) | |
| C08G 18/08 | (2006.01) | |
| C08G 18/09 | (2006.01) | |
| C08G 18/10 | (2006.01) | |
| C08G 18/28 | (2006.01) | |
| C08G 18/83 | (2006.01) | |

(52) U.S. Cl.
CPC ......... *C08G 18/797* (2013.01); *C08G 18/025* (2013.01); *C08G 18/0814* (2013.01); *C08G 18/095* (2013.01); *C08G 18/10* (2013.01); *C08G 18/1875* (2013.01); *C08G 18/285* (2013.01); *C08G 18/833* (2013.01); *Y10S 525/907* (2013.01); *Y10T 428/31547* (2015.04)

(58) Field of Classification Search
CPC ....... C08L 79/08; C08L 75/04; C09D 173/02; C08G 18/797; C08G 18/0814; C08G 18/095; C08G 64/0216; D06M 15/61; Y10S 525/907
USPC ........... 427/385.5, 386; 525/452, 591, 330.5, 525/424, 440, 458, 528; 528/68, 69, 85
See application file for complete search history.

(56) References Cited

U.S. PATENT DOCUMENTS

| | | | |
|---|---|---|---|
| 2,941,966 A | 6/1960 | Campbell | |
| 4,061,499 A | 12/1977 | Himmelmann | |
| 4,120,884 A * | 10/1978 | Woerner et al. | 560/331 |
| 4,321,172 A | 3/1982 | Lin | |
| 4,923,619 A | 5/1990 | Legros | |
| 4,938,955 A | 7/1990 | Niira | |
| 4,938,958 A | 7/1990 | Niira | |
| 5,405,644 A | 4/1995 | Ohsumi | |
| 5,698,229 A | 12/1997 | Ohsumi | |
| 5,856,014 A * | 1/1999 | Imashiro et al. | 428/425.8 |
| 5,929,188 A * | 7/1999 | Nakamura et al. | 528/68 |
| 6,013,275 A | 1/2000 | Konagaya | |
| 6,127,029 A | 10/2000 | Imashiro et al. | |
| 6,267,590 B1 | 7/2001 | Barry | |
| 6,436,422 B1 | 8/2002 | Trogolo | |
| 6,468,521 B1 | 10/2002 | Pedersen | |
| 7,098,256 B2 | 8/2006 | Ong | |
| 7,125,570 B2 | 10/2006 | Taniguchi | |
| 7,151,139 B2 | 12/2006 | Tiller | |
| 7,258,921 B2 | 8/2007 | Hashiba | |
| 7,339,015 B2 | 3/2008 | Wynne | |
| 8,258,202 B2 | 9/2012 | Chasser et al. | |
| 2004/0156918 A1 | 8/2004 | Podhajny | |
| 2005/0287353 A1 | 12/2005 | Trogolo | |
| 2006/0024264 A1 | 2/2006 | Kuroda | |
| 2006/0156948 A1 | 7/2006 | Hendriks | |
| 2007/0218095 A1 | 9/2007 | Anderson | |
| 2007/0292486 A1 | 12/2007 | Sen | |
| 2010/0204414 A1 | 8/2010 | Chasser et al. | |

FOREIGN PATENT DOCUMENTS

| | | |
|---|---|---|
| EP | 0411461 A2 | 2/1991 |
| WO | 95/34327 | 12/1995 |
| WO | 2006/020312 | 2/2006 |
| WO | 2007/014087 | 2/2007 |
| WO | 2007/070649 | 6/2007 |
| WO | 2008/033364 | 3/2008 |

OTHER PUBLICATIONS

Haldar, Jayanta et al., "Polymeric coatings that inactivate both influenza virus and pathogenic bacteria", Proceedings of the National Academy of Sciences, Nov. 21, 2006; pp. 17667-17671, vol. 103, No. 47, Melville, New York 11747-4502, USA.

Haldar, Jayanta et al., "Preparation, application and testing of permanent antibacterial and antiviral coatings", Nature Protocols, Sep. 27, 2007; pp. 2412-2417, vol. 2, No. 10, Nature Publishing Group, A Subsidiary of Macmillan Ltd., 175 Fifth Avenue, New York, New York 10010.

Ishitsuka, Yuji et al., "Amphiphillic Poly(phenyleneethynylene)s Can Mimic Antimicrobial Peptide Membrane Disordering Effect by Membrane Insertion", Journal of the American Chemical Society, Mar. 1, 2006; pp. 13123-13129, vol. 128, American Chemical Society, 1155 Sixteenth Street N.W., Washington, D.C. 20036.

Ivanov, Ivaylo et al., "Characterization of Nonbiological Antimicrobial Polymers in Aqueous Solution and at Water-Lipid Interfaces from All-Atom Molecular Dynamics", Journal of the American Chemical Society, Sep. 20, 2005; pp. 1778-1779, vol. 128, American Chemical Society, 1155 Sixteenth Street N.W., Washington, D.C. 20036.

Kuroda, Kenichi et al., "Amphiphillic Polymethacrylate Derivatives as Antimicrobial Agents", Journal of the American Chemical Society, Sep. 23, 2004; pp. 4128-4129, vol. 127, American Chemical Society, 1155 Sixteenth Street N.W., Washington, D.C. 20036.

Kurt, Pinar et al., "Highly Effective Contact Antimicrobial Surfaces via Polymer Surface Modifiers", Langmuir, Feb. 14, 2007; pp. 4719-4723, vol. 23, American Chemical Society, 1155 Sixteenth Street N.W., Washington, D.C. 20036.

(Continued)

Primary Examiner — Gregory Listvoyb
(74) Attorney, Agent, or Firm — William E. Kuss

(57) ABSTRACT

Disclosed are polycarbodiimides having onium salt groups, as well as methods for their production.

20 Claims, No Drawings

(56) References Cited

OTHER PUBLICATIONS

Lee, Sang Beom et al., "Self-Assembly of Biocidal Nanotubes from a Single-Chain Diacetylene Amine Salt", Journal of the American Chemical Society, Mar. 17, 2004; pp. 13400-13405, vol. 126, American Chemical Society, 1155 Sixteenth Street N.W., Washington, D.C. 20036.

Mowery, Brendan P. et al., "Mimicry of Antimicrobial Host-Defense Peptides by Random Copolymers", Journal of the American Chemical Society, Sep. 20, 2007; pp. 15474-15476, vol. 129, American Chemical Society, 1155 Sixteenth Street N.W., Washington, D.C. 20036.

Sambhy, Varun et al., "Silver Bromide Nanoparticle/Polymer Composites: Dual Action Tunable Antimicrobial Materials", Journal of the American Chemical Society, Mar. 1, 2006; pp. 9798-9808, vol. 128, American Chemical Society, 1155 Sixteenth Street N.W., Washington, D.C. 20036.

Tew, Gregory N. et al., "De novo design of biomimetic antimicrobial polymers", Proceedings of the National Academy of Sciences, Apr. 16, 2002; pp. 5110-5114, vol. 99, No. 8, Melville, New York 11747-4502, USA.

Zhang, Wen-Xiong, "Catalytic addition of alkyne C—H, amine N—H, and phosphone P—H bonds to carbodiimides: an efficient route to propiolamidines, guanidines, and phosphaguanidines", Organic & Biomolecular Chemistry, Jan. 4, 2008; pp. 1-22, Royal Society of Chemistry, Cambridge, Thomas Graham House (290), Science Park, Milton Road, Cambridge CB4 0WF, United Kingdom.

Campbell, Tod W. and Kenneth C. Smeltz, "High Polymers Containing the Carbodiimide Repeat Unit", J. Org. Chem., Aug. 1963, vol. 28, pp. 2069-2075.

\* cited by examiner

POLYCARBODIIMIDES HAVING ONIUM SALT GROUPS

CROSS REFERENCE TO RELATED APPLICATIONS

This application is related to (i) U.S. patent application Ser. No. 12/370,123, entitled, "Coating Compositions That Include Onium Salt Group Containing Polycarbodiimides", filed concurrently herewith; and (ii) U.S. patent application Ser. No. 12/370,161, entitled "Antimicrobial Coating Compositions, Related Coatings and Coated Substrates", also filed concurrently herewith.

FIELD OF THE INVENTION

The present invention is directed to polycarbodiimides having onium salt groups.

BACKGROUND OF THE INVENTION

It is sometimes desirable to include agents, such as quaternary onium salts, silver ions, iodine ions, and the like, into coatings in order to provide a surface that is capable of killing harmful microorganisms.

Silver ions, for example, are sometimes embedded in a porous material, such as zeolite, which is incorporated into a coating composition. In these situations, the silver ions are released gradually into the coating to impart antimicrobial properties, but the eventually depletion of the silver ions will ultimately render the coating ineffective. Moreover, a significant problem associated with such antimicrobial agents is their tendency to cause discoloration of the composition into which they are incorporated. This discoloration results from the interaction of silver ions with other compounds, ions, and the like present in the composition into which the antimicrobial agent is incorporated. As will be appreciated, such discoloration can be particularly problematic in coatings applications where decorative properties are often critical.

Quaternary onium salts can be effective antimicrobial agents in coating compositions, because they are known to selectively attack bacterial cells and not mammalian cells. Unfortunately, these materials are typically unreactive with the primary film forming resin binder of the coating composition, such as resins containing carboxylic acid groups, which are often employed in thermosetting compositions. As a result, such onium salts are susceptible to leaching out of or phase separating from the binder, thereby rendering the onium salt ineffective and/or the coating composition unsuitable for use for other reasons.

As a result, it would be desirable to provide antimicrobial coating compositions that include an antimicrobial agent that will not be depleted and will not phase separate in a coating composition comprising a film-forming resin binder having functional groups. The present invention has been developed in view of the foregoing desire.

SUMMARY OF THE INVENTION

In certain respects, the present invention is directed to polycarbodiimides comprising terminal onium salt groups, wherein the terminal onium salt groups comprise a halogen counterion. Such polycarbodiimides may, in certain embodiments, also comprise pendant onium salt groups In other respects, the present invention is directed to polycarbodiimides comprising pendant onium salt group. Such polycarbodiimides may, in certain embodiments, also comprise terminal onium salt groups.

The present invention is also directed to, inter alia, methods for making such polycarbodiimides.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to polycarbodiimides. As used herein, the term "polycarbodiimide" refers to a polymer containing two or more units having the structure:

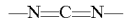

As used herein, the term "polymer" includes oligomers and both homopolymers and copolymers, and the prefix "poly" refers to two or more. As will be appreciated, polycarbodiimides can generally be prepared by condensation reacting a polyisocyanate in the presence of a suitable catalyst to form a polycarbodiimide having terminal NCO-functionality.

Suitable polyisocyanates for use in the foregoing condensation reaction, include, without limitation, aliphatic, including cycloaliphatic, heterocyclic, and/or aromatic polyisocyanates. Such polyisocyanates can contain, for example, from 2 to 4, such as 2 isocyanate groups per molecule. Examples of suitable higher polyisocyanates are 1,2,4-benzene triisocyanate and polymethylene polyphenyl isocyanate. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Examples of suitable cycloaliphatic diisocyanates are 1,4-cyclohexyl diisocyanate, isophorone diisocyanate, alpha, alpha-xylylene diisocyanate, dicyclohexylmethyldiisocyanate ("TMXDI"), and 4,4-methylene-bis(cyclohexyl isocyanate). Substituted organic polyisocyanates can also be used in which the substituents are nitro, chloro, alkoxy and other groups that are not reactive with hydroxyl groups or active hydrogens and provided the substituents are not positioned to render the isocyanate group unreactive.

Thioisocyanates can be employed as well as mixed compounds containing both an isocyanate and a thioisocyanate group. The terms "polyisocyanate" and "diisocyanate", as used herein, are intended to cover compounds and adducts containing thioisocyanate groups or isocyanate groups and compounds and adducts containing both isocyanate and thioisocyanate groups.

The polyisocyanate can be an NCO-containing adduct such as would be formed, for example, when an active hydrogen-containing compound is present before or during polycarbodiimide formation, as described below.

As previously indicated, the present invention is directed to polycarbodiimides comprising pendant and/or terminal onium salt groups, wherein the terminal onium salt groups comprise a halogen counterion. Thus, certain embodiments of the present invention are directed to polycarbodiimides terminated with halogen counterion-containing onium salts. As used herein, the term "halogen counterion-containing onium salts" refers to onium salts wherein the counterion to the onium ion comprises a halogen ion, such as a fluorine, chlorine, bromine, and/or iodine ion.

In certain embodiments of the present invention, the polycarbodiimides terminated with halogen counterion-containing onium salts have the structure (I) or (II):

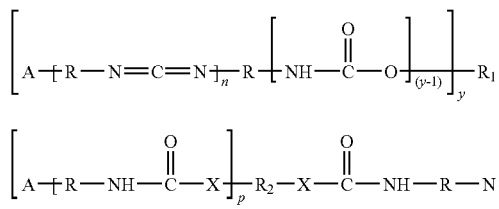

in which: (a) each R is a divalent linking group and each may be the same or different; (b) $R_1$ is A when y is 1 and is the residue of an active hydrogen-containing chain extender when y is at least 2; (c) each $R_2$ is a linking group and may be the same or different; (d) each X is O, NH, or S and may be the same or different; (e) n has a value of at least 2; (f) p has a value of 1 to 3; and (g) y has a value of 1 to 4; and (h) each A is represented by the structure (III):

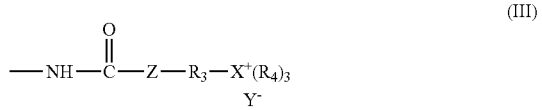

in which: (1) each X is N or P and may be the same or different; (2) each Y is a halogen and may be the same or different; (3) each Z is O, NH, or S and may be the same or different; (4) each $R_3$ is a divalent linking group and may be the same or different; and (5) each $R_4$ is a monovalent group and may be the same or different.

In the foregoing structures (I) and (II), n has a value of at least 2, in some cases at least 3. In certain embodiments, n in the foregoing structures has a value of not more than 100, such as not more than 20, not more than 10, or, in some cases, not more than 5. The value of "n" can range between any combination of the recited values inclusive of the recited values.

In the foregoing structures (I) and (II), R and $R_3$ are both divalent linking groups. As used herein, "divalent" refers to a substituent group that, as a substituent group, forms two single, covalent bonds. In certain embodiments, the divalent linking group comprises carbon in the linking group backbone, such as is the case with hydrocarbon and fluorocarbon linking groups. As used herein, the terms "hydrocarbon group" and "fluorocarbon group" encompass various groups, such as, for example, branched or unbranched, acyclic or cyclic, saturated or unsaturated groups, and can contain from, for example, 1 to 24 (or in the case of an aromatic group from 3 to 24) carbon atoms. Non-limiting examples of suitable divalent hydrocarbon linking groups include straight or branched chain alkylenes, such as methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of suitable divalent hydrocarbon linking groups also include cyclic alkylenes, such as cyclopentylene, cyclohexylene, cycloheptylene, cyclooctylene, and alkyl-substituted derivatives thereof. In certain embodiments, the divalent linking group can be chosen from phenylene and alkyl-substituted phenylene, such as methyl, ethyl, propyl, isopropyl and nonyl substituted phenylene.

In the foregoing structures (I) and (II), each $R_4$ represents a "monovalent group". As used herein, "monovalent" refers to a substituent group that, as a substituent group, forms only one single, covalent bond. In certain embodiments, the monovalent group is a monovalent hydrocarbon group, such as, for example, alkyl, cycloalkyl, alkoxy, aryl, alkenyl, alkaryl, and alkoxyaryl groups. Nonlimiting examples of suitable alkyl groups include, for example, methyl, ethyl, propyl, isopropyl, iso-butyl, t-butyl, n-butyl, pentyl, hexyl, heptyl, octyl, nonyl, decyl, and dodecyl groups. As used herein, "lower alkyl" refers to alkyl groups having from 1 to 6 carbon atoms. Nonlimiting examples of suitable alkenyl groups include, for example, vinyl, allyl, and hexenyl. Nonlimiting examples of suitable substituted alkyl groups include, for example, chloromethyl, 3,3,3-trifluoropropyl, and 6-chlorohexyl. Nonlimiting examples of suitable cycloalkyl groups include, for example, cyclohexyl and cyclooctyl. Nonlimiting examples of suitable aryl groups include, for example, phenyl and naphthyl. Nonlimiting examples of suitable substituted aryl groups include, for example, benzyl, tolyl and ethylphenyl.

In the foregoing structure (I), $R_1$ is A when y is 1 and, alternatively, is the residue of an active hydrogen-containing chain extender when y is at least 2. More specifically, the residue of an active hydrogen-containing chain extender will have the structure (IV):

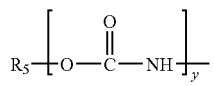
(IV)

in which y is as described above in structure (I) and $R_5$ is a divalent linking group when y is 2, a trivalent linking group with y is 3, and a tetravalent linking group when y is 4. Suitable divalent linking groups for $R_5$ include, for example, any of the divalent linking groups referenced earlier with respect to R and $R_3$. Suitable trivalent linking groups include, for example, a trivalent group resulting from removal of a hydrogen atom from a backbone carbon in any of such divalent linking groups. Suitable tetravalent linking groups include, for example, a tetravalent group resulting from removal of two hydrogen atoms from a backbone carbon in any of such divalent linking groups.

In the foregoing structure (II), $R_2$ is a linking group. More particularly, $R_2$ is a divalent linking group when p is 1, a trivalent linking group when p is 2, and a tetravalent linking group when p is 3. Suitable divalent linking groups for $R_2$ include, for example, any of the divalent linking groups referenced earlier with respect to R and $R_3$. Suitable trivalent linking groups include, for example, a trivalent group resulting from removal of a hydrogen atom from a backbone carbon in any of such divalent linking groups. Suitable tetravalent hydrocarbon linking groups include, for example, a tetravalent group resulting from removal of two hydrogen atoms from a backbone carbon in any of such divalent linking groups.

The foregoing polycarbodiimides terminated with halogen counterion-containing onium salts can be made by any of a variety of methods starting from a polycarbodiimide having terminal NCO-functionality produced as described earlier, for example. Moreover, the polycarbodiimides of the present invention can be produced with or without use of an active hydrogen-containing chain extender.

The active hydrogen-containing chain extender is a spacer linking polyisocyanates together or linking isocyanate functional polycarbodiimides together, depending upon when the active hydrogen compound is added. For example, the chain extender can be added before, during, or after formation of the polycarbodiimide having terminal NCO-functionality described earlier. The foregoing polycarbodiimides terminated with halogen counterion-containing onium salts will have: (a) the structure (I) wherein y is 1 when no chain extender is employed; (b) the structure (I) wherein y is at least 2, such as 2 to 4, when the chain extender is added after formation of an isocyanate terminated polycarbodiimide as described above; and (c) the structure (II) when the chain extender is present before or during formation of the isocyanate terminated polycarbodiimide as described above.

Any suitable organic compound containing active hydrogens may be used as the chain extender, if a chain extender is employed. The term "active hydrogen atoms" refers to hydrogens which, because of their position in the molecule, display activity according to the Zerewitinoff test. Accordingly, active hydrogens include hydrogen atoms attached to oxygen, nitrogen, or sulfur, and thus useful compounds will include those having at least two hydroxyl, thiol, primary amine, and/or secondary amine groups (in any combination).

In certain embodiments, the active hydrogen-containing chain extender contains from 2 to 4 active hydrogens per molecule.

Examples of such compounds include amines, which includes polyamines, aminoalcohols, mercapto-terminated derivatives, and alcohols that includes polyhydroxy materials (polyols). Suitable polyhydroxyl materials or polyols include low or high molecular weight materials and in, in certain cases, have average hydroxyl values as determined by ASTM designation E-222-67, Method B, of 2000 and below, such as between below 2000 and 10. The term "polyol" is meant to include materials having an average of two or more hydroxyl groups per molecule.

Suitable polyols include low molecular weight diols, triols and higher alcohols, low molecular weight amide-containing polyols and higher polymeric polyols such as polyester polyols, polyether polyols, polycarbonate polyols and hydroxy-containing (meth)acrylic polymers. The polymers typically have hydroxyl values of from 10 to 180.

The low molecular weight diols, triols and higher alcohols useful in the instant invention are known in the art. They have hydroxy values of 200 or above, usually within the range of 200 to 2000. Such materials include aliphatic polyols, particularly alkylene polyols containing from 2 to 18 carbon atoms. Examples include ethylene glycol, 1,4-butanediol, 1,6-hexanediol; cycloaliphatic polyols such as 1,2-cyclohexanediol and cyclohexane dimethanol. Examples of triols and higher alcohols include trimethylol propane, glycerol and pentaerythritol. Also useful are polyols containing ether linkages such as diethylene glycol and triethylene glycol and oxyalkylated glycerol and longer chain diols such as dimer diol or hydroxy ethyl dimerate.

As described above, to manufacture a polycarbodiimide, an isocyanate terminated polycarbodiimide is first formed by condensation reacting a polyisocyanate, which may or may not have been previously chain extended by the reaction of a polyisocyanate with an active-hydrogen containing chain extender of the type previously described. The polyisocyanate is condensed with the elimination of carbon dioxide to form the isocyanate-terminated polycarbodiimide.

The condensation reaction is typically conducted by taking the solution of a polyisocyanate and heating in the presence of suitable catalyst. Such reaction is described, for example by K. Wagner et al., Angew. Chem. Int. Ed. Engl., vol. 20, p. 819-830 (1981). Representative examples of suitable catalysts are described in e.g. U.S. Pat. No. 2,941,988, U.S. Pat. No. 3,862,989 and U.S. Pat. No. 3,896,251. Examples include 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-methylphospholen-1-oxide, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the polyisocyanate being used. A concentration range of 0.05-5 parts of catalyst per 100 parts of adduct is generally suitable.

The resulting polycarbodimide has terminal isocyanate groups. The isocyanate-terminated polycarbodiimide can then be further reacted to form a halogen counterion-containing onium salt group terminated polycarbodiimide. Such halogen counterion-containing onium salt group terminated polycarbodiimides can be prepared by a variety of methods.

In certain embodiments, to manufacture a polycarbodiimide terminated with halogen counterion-containing onium salts of the type described above, an isocyanate terminated polycarbodiimide is reacted with a halogen counterion-containing onium salt comprising an active hydrogen group, such as, for example, one or more hydroxyalkylammonium compounds, aminoalkylammonium compounds, thiolalkylammonium compounds, hydroxyalkylphosphonium compounds, aminoalkylphosphonium compounds, and thiolalkylphosphonium compounds. Specific examples of suitable hydroxyalkylammonium compounds include, without limitation, N,N,N-trimethyl-hydroxymethylammonium chloride|bromide/iodide, N,N,N-trimethyl-hydroxyethylammonium chloride|bromide/iodide and N-oleyl-N,N-dimethyl-hydroxymethylammonium bromide/chloride/iodide.

The Examples set forth herein illustrate suitable conditions for carrying out the foregoing reaction. In certain embodiments, reaction of the halogen counterion-containing onium salt comprising an active hydrogen group with the NCO-containing carbodiimide is conducted with a stoichiometric equivalent of onium salts to NCO equivalents or a slight excess of onium salts and at a temperature of, for example, 80 to 110° C. until an IR spectrum of the reaction mixture indicates substantially no remaining NCO functionality. Organic solvent can optionally be present. Moreover, a catalyst may be used if desired to catalyze the reaction of the isocyanate groups with the active hydrogen groups. Suitable catalysts include organotin compounds such as dibutyltin oxide, dioctyltin oxide, dibutyltin dilaurate, and the like.

In other embodiments, to manufacture a polycarbodiimide terminated with halogen counterion-containing onium salts as described above, the previously described isocyanate terminated polycarbodiimide is first reacted with a compound having the structure (V):

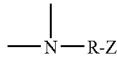

(V)

wherein R is a divalent linking group, such as any of those described earlier, and Z is an active hydrogen group, such as any of those described earlier, to form a polycarbodiimide having terminal groups having the structure (VI):

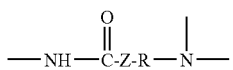

(VI)

wherein R is a divalent linking group, such as any of those described earlier, and Z is the residue of an active hydrogen group, such as, for example, O, S or NH.

In certain embodiments, the compound of the structure (V) includes an alcohol amine having at least one primary, secondary, or tertiary amino group and at least one hydroxyl group. Examples of such alcohol amines include, but are not limited to, monoethanolamine, diethanolamine, dimethylaminoethanol, diisopropanolamine, dimethylaminopropanol, aminopropyldiethanolamine, diethylaminopropylamine, hydroxyalkylmorpholine, such as hydroxyethylmorpholine, and hydroxyalkylpiperazine, such as hydroxyethylpiperazine, and the like and mixtures thereof.

The Examples set forth herein illustrate suitable conditions for carrying out the foregoing reaction. In certain embodiments, the reaction is conducted at a temperature of, for example, 80 to 110° C. until an IR spectrum of the reaction mixture indicates substantially no remaining NCO functionality. Organic solvent and/or a catalyst can optionally be present.

In these embodiments, the resultant polycarbodiimide having terminal groups having the structure (VI) is then reacted with a halide, such as an alkyl, cycloalkyl and aralkyl, or benzyl halide to form a halogen counterion-containing onium salt group terminated polycarbodiimide of the present invention. Suitable such halides for use in the present invention include, for example, primary alkyl halides such as 1-bromooctane, 1-bromododecane or 1-bromohexadecane. In certain embodiments, it is desirable to employ an alkyl halide containing at least four carbon atoms, such as 1-bromodecane, 10-bromo-1-decanol, and 1-bromododecane. In certain embodiments, it is desirable to employ an alkyl halide wherein the alkyl moiety is straight-chain or has a —CH(CH₃)— group and contains a total of 6 to 16 carbon atoms, for example, 1-bromohexane, 1-bromododecane and 1,6-dichlorohexane.

The Examples set forth herein illustrate suitable conditions for carrying out the foregoing reaction, which is often conducted at a temperature of, for example, 80 to 110° C. Organic solvent and/or a catalyst, such as potassium carbonate, can optionally be present.

In certain embodiments, the present invention is directed to polycarbodiimides comprising pendant onium salt groups. Such pendant onium salt groups may be in addition to or in lieu of the previously described terminal onium salt groups. These polycarbodiimides of the present invention comprise a unit having the general structure (VII):

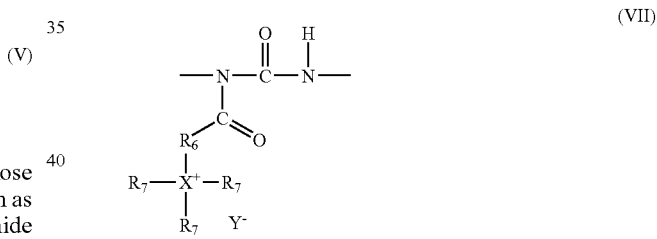

(VII)

wherein: (a) X is N or P; (b) Y is an anion, such as a halogen, OH, BF₄, BF₆, PF₆, AsF₆, CF₃SO₃, ClO₄, or an anion of organic sulfonic acid; (c) R₆ is a divalent linking group; and (d) each R₇ is H or a monovalent group and may be the same or different.

In the foregoing structure (VII), R₆ is a divalent linking group. Suitable divalent linking groups for R₆ include, for example, any of the divalent linking groups referenced earlier with respect to R and R₃ in structures (I) and (II).

In the foregoing structure (VII), each R₇ represents hydrogen or a monovalent group. Suitable monovalent groups for R₇ include, for example, any of the monovalent groups referenced earlier with respect to R₄ in structures (I) and (II).

The pendant onium salt group containing polycarbodiimides of the present invention can be made by any of a variety of methods starting from a polycarbodiimide having terminal NCO-functionality produced as described earlier, for example. Moreover, the polycarbodiimides of the present invention can be produced with or without use of an active hydrogen-containing chain extender. Suitable chain extenders include any of those described earlier with respect to the preparation of polycarbodiimides terminated with halogen counterion-containing onium salts.

Depending upon whether a chain extender is employed and, if so, when it is added, certain embodiments of the polycarbodiimides of the present invention will have the structure (VIII) or (IX):

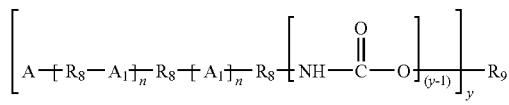

(VIII)

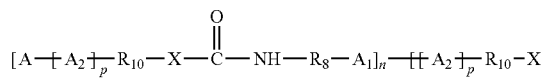

(IX)

in which: (a) each $R_8$ is a divalent linking group and each may be the same or different; (b) $R_9$ is A when y is 1 and is the residue of an active hydrogen-containing chain extender when y is at least 2; (c) each $R_{10}$ is a linking group and may be the same or different; (d) each X is O, NH, or S and may be the same or different; (e) each n has a value of at least 1 and may be the same or different wherein at least one n has a value of at least 2; (f) p has a value of 1 to 3; (g) y has a value of 1 to 4; (h) each A represents a terminal group, in some cases a reactive functional group, such as an isocyanate group; (i) each $A_1$ represents a unit having the general structure (VIII) or a —N=C=N— unit; and (j) each $A_2$ represents a unit having the structure (X):

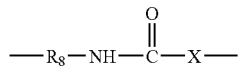

(X)

wherein $R_8$ is as defined above.

In certain embodiments of the foregoing structures (VIII) and (IX), n has a value of at least 2, in some cases at least 3. In certain embodiments, n in the foregoing structures has a value of not more than 100, such as not more than 20, not more than 10, or, in some cases, not more than 5. The value of "n" can range between any combination of the recited values inclusive of the recited values.

Such polycarbodiimides comprising pendant onium salts will have: (a) the structure (VIII) wherein y is 1 when no chain extender is employed; (b) the structure (VIII) wherein y is at least 2, such as 2 to 4, when the chain extender is added after formation of an isocyanate terminated polycarbodiimide; and (c) the structure (IX) when the chain extender is present before or during formation of the isocyanate terminated polycarbodiimide.

A polycarbodiimide comprising pendant onium salt groups can be prepared by a variety of methods. In certain embodiments, to manufacture a polycarbodiimide comprising pendant onium salts, a polycarbodiimide, such as the previously described isocyanate terminated polycarbodiimide, is reacted with an onium salt comprising carbodiimide reactive groups, such as a compound containing an onium group linked to a carboxylic acid. Non-limiting examples of such compounds are betaine hydrochloride and betaine hydrobromide.

The Examples set forth herein illustrate suitable conditions for carrying out the foregoing reaction. The reaction of the polycarbodiimide with the onium salt comprising carbodiimide reactive groups is desirably conducted with a stoichiometric excess of carbodiimide groups to carbodiimide reactive groups so that carbodiimide groups remain on the main chain of the reaction product. In certain embodiments, the foregoing reaction takes place at a temperature of, for example, 40 to 70° C. and may take place in the presence of an organic solvent and/or catalyst.

In other embodiments, a polycarbodiimide comprising pendant onium salts is prepared by first reacting a polycarbodiimide, such as the previously described isocyanate terminated polycarbodiimide, with an amino acid, i.e., a molecule containing both amine and carboxyl functional groups, to form a polycarbodiimide comprising a unit having the general structure (XI):

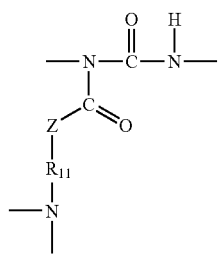

(XI)

wherein $R_{11}$ is a divalent linking group, such as any of those described earlier with respect to R and $R_3$, and Z is the residue of an active hydrogen group, such as, for example, O, S or NH.

Examples of suitable amino acids include alanine, glycine, N-acetyl glycine, aminocaproic acid, alpha-amino hexanoic acid (norleucine), methionine, serine, threonine, aspartic acid, (2-amino succinic acid) and the like.

The reaction of the polycarbodiimide with the amino acid is desirably conducted with a stoichiometric excess of carbodiimide groups to acid groups so that carbodiimide groups remain on the main chain of the reaction product. In certain embodiments, the reaction is conducted at a temperature of, for example, 80 to 110° C. and may take place in the presence of organic solvent and/or a catalyst.

In these embodiments, the resultant polycarbodiimide comprising a unit having the general structure (XI) is then reacted with a halide, such as an alkyl, cycloalkyl and aralkyl, or benzyl halide to form a polycarbodiimide of the present invention. Suitable such halides for use in this reaction, for example, an alkyl, cycloalkyl and aralkyl, or benzyl halides. Suitable such halides for use in the present invention include, for example, primary alkyl halides such as 1-bromooctane, 1-bromododecane or 1-bromohexadecane. In certain embodiments, it is desirable to employ an alkyl halide containing at least four carbon atoms, such as 1-bromodecane, 10-bromo-1-decanol, and 1-bromododecane. In certain embodiments, it is desirable to employ an alkyl halide wherein the alkyl moiety is straight-chain or has a —CH(CH$_3$)— group and contains a total of 6 to 16 carbon atoms, for example, 1-bromohexane, 1-bromododecane and 1,6-dichlorohexane.

The foregoing reaction is often conducted at a temperature of, for example, 80 to 110° C. Organic solvent and/or a catalyst can optionally be present.

In certain embodiments, the isocyanate terminated polycarbodiimide is reacted with a compound comprising an active hydrogen group in order to change the terminal group functionality of the polycarbodiimide from isocyanate to another functionality or, if desired, to render the terminal ends of the polycarbodiimide nonfunctional. Reaction of the terminal end groups of the polycarbodiimide with a compound comprising an active hydrogen group can take place before, during, or after formation of a pendant onium salt containing polycarbodiimide of the present invention.

In certain embodiments, for example, the terminal isocyanate groups of the polycarbodiimide are capped by reaction of the isocyanate groups with a compound comprising one active hydrogen group. Any suitable aliphatic, cycloaliphatic or aromatic alkyl monoalcohol or phenolic compound or oxime or lactam or amine may be used as a capping agent. Nonexclusive examples include: lower aliphatic alcohols such as methanol, ethanol, n-butanol and long chain alcohols, such as 1-(hexadecylamino)icosan-3-one; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers. Other suitable capping agents include oximes such as methyl ethyl ketoxime, acetone oxime and cyclohexanone oxime, lactams such as epsilon-caprolactam, and amines such as dibutyl amine benzylamine, ethylamine, n-propylamine, isopropylamine, n-butylamine, iso-butylamine tert.-butylamine, cyclohexylamine, dibutylamine, diethylamine and diethanolamine.

The foregoing reaction results in a polycarbodiimide wherein, in certain embodiments, A in structures (VIII) and (IX) is represented by the structure (XII):

(XII)

in which X is O or NH and R is a monovalent group, such as any of those described earlier.

In certain embodiments, the terminal isocyanate groups of the polycarbodiimide are capped by reaction of the isocyanate groups with a compound comprising an active hydrogen group and an onium salt group, such as a halogen counterion-containing onium salt, as described above, to product a polycarbodiimide comprising pendant and terminal onium salts.

In certain embodiments, a polycarbodiimide of the present invention can be used in coating compositions to impart antimicrobial properties to such compositions. In certain embodiments, therefore, such coating compositions are "antimicrobial coating compositions." As used herein, the term "antimicrobial coating composition" refers to a coating composition capable of producing a coating that has the ability to effect a significant, such as at least a 90% reduction (1-log order reduction), in the population of bacteria and other microbes, and thereby control the growth of microorganisms. The control of the growth of microorganisms may also be referred to as antimicrobial activity. Also, in certain embodiments, the antimicrobial compositions of the invention can provide a coating that causes greater than a 99% reduction (2-log order reduction), such as greater than a 99.99% reduction (4-log order reduction), or, in some cases, greater than a 99.999% reduction (5-log order reduction) in the microbial population in contact with the coating.

Such coating compositions often comprise a film-forming resin that is different from the polycarbodiimides described above. As used herein, the term "film-forming resin" refers to resins that can form a self-supporting continuous film on at least a horizontal surface of a substrate upon removal of any diluents or carriers present in the composition or upon curing at ambient or elevated temperature.

Film-forming resins that may be used in such coating compositions include, without limitation, those used in automotive OEM coating compositions, automotive refinish coating compositions, industrial coating compositions, architectural coating compositions, coil coating compositions, protective and marine coating compositions, and aerospace coating compositions, among others.

In certain embodiments, the film-forming resin included within the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAFE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating composition comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

One particular advantage of the polycarbodiimides of the present invention is that the carbodiimide groups on the polymer are susceptible to crosslinking with certain functional group containing resins, such as carboxyl, hydroxyl, amino, phosphine, and acetylinic functional group containing resins, to form a thermoset coating in which the terminal and, optionally, pendant onium salt groups are stabilized in the coating.

In certain embodiments, the coating composition comprises a film-forming resin comprising carboxylic acid functional groups. In these embodiments, the carboxyl-containing resin is not particularly restricted but may be, for example, a carboxyl-containing polyester resin, acrylic resin and/or polyurethane resin.

Suitable carboxyl-containing polyester resins can be prepared by condensation in the conventional manner, such as from an alcohol component and an acid component. The polyester resin so referred to herein includes the so-called alkyd resins as well.

As to the above alcohol component, there may be specifically mentioned those having two or more hydroxy groups within each molecule, such as triols such as trimethylolpropane and hexanetriol, and diols such as propylene glycol, neopentyl glycol, butylene glycol, hexylene glycol, octylene glycol, 1,6-hexanediol, 1,8-octanediol, 1,9-nonanediol, 1,10-decanediol, 1,12-dodecanediol, 1,2-cyclohexanediol, 1,3-cyclohexanediol, 1,4-cyclohexanediol, hydrogenated bisphenol A, caprolactone diol and bishydroxyethyltaurine. The above alcohol component may comprise two or more species.

The above acid component specifically includes those having two or more carboxyl groups within each molecule, for example aromatic dicarboxylic acids such as phthalic acid and isophthalic acid, aliphatic dicarboxylic acids such as adipic acid, azelaic acid and tetrahydrophthalic acid, and tricarboxylic acids such as trimellitic acid. Furthermore, mention may be made of long-chain fatty acids such as stearic acid, lauric acid and like ones, oleic acid, myristic acid and like unsaturated ones, natural fats or oils such as castor oil, palm oil and soybean oil and modifications thereof. The above acid component may comprise two or more species.

Diacids and diols of fatty acids such as EMPOL 1010 fatty diacid from the Cognis Emery Group can be used or its corresponding diol can be used.

Furthermore, as the one having a hydroxyl group(s) and a carboxyl group(s) within each molecule, there may be mentioned hydroxycarboxylic acids such as dimethylolpropionic acid and the like.

In cases where the polyester resin obtained has hydroxy groups, the whole or part thereof may be modified with an acid anhydride, such as phthalic anhydride, succinic anhydride, hexahydrophthalic anhydride or trimellitic anhydride, so that the resin may have carboxyl groups.

Suitable carboxyl-containing acrylic resins can be obtained in the conventional manner, specifically by solution or emulsion polymerization, of a carboxyl-containing ethylenically unsaturated monomer and another ethylenically unsaturated monomer.

Exemplary carboxyl-containing ethylenically unsaturated monomers include acrylic acid, methacrylic acid, ethacrylic acid, crotonic acid, maleic acid, fumaric acid, itaconic acid, half esters thereof such as maleic acid ethyl ester, fumaric acid ethyl ester and itaconic acid ethyl ester, succinic acid mono(meth)acryloyloxyethyl ester, phthalic acid mono (meth)acryloyloxyethyl ester and the like, including mixtures thereof.

Exemplary other ethylenically unsaturated monomer include hydroxy-containing ethylenically unsaturated monomers, such as 2-hydroxyethyl acrylate, 2-hydroxyethyl methacrylate, 4-hydroxybutyl acrylate, 4-hydroxybutyl methacrylate and products derived therefrom by reaction with lactones; amide-containing ethylenically unsaturated monomers, such as acrylamide, methacrylamide, N-isopropylacrylamide, N-butylacrylamide, N,N-dibutylacrylamide, hydroxymethylacrylamide, methoxymethylacrylamide and butoxymethylacrylamide and like (meth)acrylamides; and nonfunctional ethylenically unsaturated monomers, such as styrene, alpha-methylstyrene, acrylate esters (e.g. methyl acrylate, ethyl acrylate, butyl acrylate, 2-ethylhexyl acrylate) and methacrylate esters (e.g. methyl methacrylate, ethyl methacrylate, butylmethacrylate, isobutylmethacrylate, tert-butyl methacrylate, 2-ethylhexyl methacrylate, lauryl methacrylate), and so forth, including mixtures thereof.

For obtaining the desired resin by emulsion polymerization, specifically a carboxyl-containing ethylenically unsaturated monomer, another ethylenically unsaturated monomer, and an emulsifier are often subjected to polymerization in water. As specific examples of the carboxyl-containing ethylenically unsaturated monomer and of the other ethylenically unsaturated monomer, there may be mentioned those already mentioned hereinabove. The emulsifier is not particularly restricted but may be any of those well known to a skilled person in the art.

Suitable carboxyl-containing polyurethane resins can be produced, for example, by reacting a compound having an isocyanato group at both termini and a compound having two hydroxy groups and at least one carboxyl group.

The compound having an isocyanato group at both termini can be prepared, for example, by reacting a hydroxy-terminated polyol and a diisocyanate compound, as will be understood by those skilled in the art. The compound having two hydroxy groups and at least one carboxyl group is, for example, dimethylolacetic acid, dimethylolpropionic acid or dimethylolbutyric acid.

The coating composition may comprise two or more species of the carboxyl-containing resin.

The acid value carboxyl-containing resin is not particularly restricted but is often from 2 to 200, such as 2 to 30 or 20 to 200.

The coating compositions can be organic solvent borne or waterborne, i.e., aqueous based. In the case of aqueous based compositions, the carboxyl-containing resin is often in the form of an aqueous dispersion or solutions of a carboxyl-containing resin neutralized with a neutralizing agent. The neutralizing agent is not particularly restricted but includes, among others, organic amines such as monomethylamine, dimethylamine, trimethylamine, triethylamine, diisopropylamine, monoethanolamine, diethanolamine and dimethylethanolamine, and inorganic bases such as sodium hydroxide, potassium hydroxide and lithium hydroxide. The degree of neutralization is not particularly restricted but can judiciously be selected according to the molecular weight and acid value of the resin and is, for example, 20 to 120%.

In certain embodiments, the mole ratio of the total number of carbodiimide groups within the thermosetting coating composition to the total number of carboxylic acid groups within the composition is 0.05 to 3/1, such as 0.05 to 2/1.

The thermosetting coating compositions can further include a crosslinking agent, different from the polycarbodiimides of the present invention, corresponding to the functional group within the carboxyl-containing aqueous resin composition. When, for example, the carboxyl-containing resin is a hydroxy-containing one, the auxiliary crosslinking agent may be an amino resin or (blocked) polyisocyanate, for instance. It may comprise a single species or two or more species. As specific examples of the amino resin, there may be mentioned alkoxylated melamine-formaldehyde or paraformaldehyde condensation products, for example condensation products from an alkoxylated melamine-formaldehyde such as methoxymethylolmelamine, isobutoxymethylolmelamine or n-butoxymethylolmelamine, as well as such commercial products available under the trademark Cymel 303. As specific examples of the above (blocked) polyisocyanate compound, there may be mentioned polyisocyanates such as trimethylene diisocyanate, hexamethylene diisocyanate, xylylene diisocyanate and isophoronediisocyanate, and derivatives thereof obtained by addition of an active hydrogen-containing blocking agent such as an alcohol compound or an oxime compound and capable of regenerating an isocyanato group by dissociation of the blocking agent upon heating. The content of the auxiliary crosslinking agent is not particularly restricted but may adequately be selected by one having an ordinary skill in the art according to the functional group value of the carboxyl-containing aqueous resin composition, the auxiliary crosslinking agent species and so forth.

In addition to the polycarbodiimides of the present invention, the coating composition may comprise other components exhibit antimicrobial properties, such as other monomeric or polymeric halogen counterion-containing onium compounds, such as quaternary compounds, as is the case with ammonium ($NH_4+$) and phosphonium ($PH_4+$) compounds, ternary compounds, as is the case with sulfonium ($H_3S+$) compounds, or binary compounds, as is the case with fluoronium ($H_2F+$), chloronium, ($H_2Cl+$), bromonium ($H_2Br+$) and iodonium ($H_2I+$) compounds.

Specific examples of monomeric quaternary ammonium salts that are suitable for use include, without limitation, tetraalkylammonium salts, trialkylarylammonium salts, dialkyldiarylammonium salts, alkyltriarylammonium salts, tetraarylammonium salts, cyclic ammonium salts and dicyclic ammonium salts.

Quaternary ammonium compounds that are suitable for use include chlorides, for example, dimethyl-didodecylammonium chloride, trimethyldodecylammonium chloride, dimethyldioctadecylammonium chloride, trimethyloctadecylammonium chloride, dodecyldimethyl-onium chloride, di-methylditallowammonium chloride, trimethylsoyammonium chloride, methyldibutylbenzylammonium chloride, methyldihexylbenzylammonium chloride, methyldioctylbenzylammonium chloride, methyldihexadecylbenzylammonium chloride, methylethyldidodecylammonium chloride, methylhexadecylpyridinium chloride, trimethyldodecyloxyphenylammonium chloride, dimethyldodecylmethylallylammonium chloride, phenyldialkyloctadecylammonium chloride, dimethylchlorobenzyloctylammonium chloride, dimethylheptadecyl-B-naphthylammonium chloride, N-stearamidomethyl-N-ethoxymethyl-N-dimethylammonium chloride, N-geranyl-N-dodecylpiperidinium chloride, N—N-dimethylpyrrolidinium chloride, and methylalkylpolyoxyalkyleneammonium chloride.

Also suitable for use are quaternary ammonium bromides, such as tetrabutylammonium bromide, tetrapentylammonium bromide, tetrahexylammonium bromide, tetraoctylammonium bromide, tetralaurylammonium bromide, tetraphenylammonium bromide, tetranaphthylammonium bromide, tetrastearylammonium bromide, lauryltrimethylammonium bromide, stearyltrimethylammonium bromide, behenyltrimethylammonium bromide, lauryltriethylammonium bromide, phenyltrimethylammonium bromide, 3-trifluoromethylphenyltrimethylammonium bromide, benzyltrimethylammonium bromide, dibenzyldimethylammonium bromide, distearyldimethylammonium bromide, tristearylmethylammonium bromide, benzyltriethylammonium bromide, hydroxyphenyltrimethylammonium bromide and N-methylpyridinium bromide.

Inorganic antimicrobial agents are also suitable for use in the coating compositions. These materials often employ metals, especially silver, zinc, gold, and/or copper. Ionic forms of these metals are often used.

The coating compositions can further include additives as are commonly known in the art, such as surfactants, wetting agents, and colorants, among others. Typical additives include benzoin, used to reduce entrapped air or volatiles; flow aids or flow control agents which aid in the formation of a smooth and/or glossy surface, for example, MODA-FLO® available from Monsanto Chemical Co., waxes such as MICROWAX® C available from Hoechst, and fillers such as calcium carbonate, barium sulfate and the like.

As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

The coating compositions can be prepared by any method well known to the one having an ordinary skill in the art using the above components as raw materials. A suitable method is illustrated in the Examples herein.

The coating compositions are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co)polymers of (meth)acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe mid soles. Different types of EVA foam can have different types of surface porosity. Molded EVA can comprise a dense surface or "skin", whereas flat sheets or slabs can exhibit a porous surface.

The coating compositions can be applied to such substrates by any of a variety of methods including dipping or immersion, spraying, intermittent spraying, dipping followed by spraying, spraying followed by dipping, brushing, or roll-coating, among other methods. In certain embodiments, however, the coating compositions are applied by spraying and, accordingly, such compositions often have a viscosity that is suitable for application by spraying at ambient conditions.

After application of the coating composition to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film, therefore, comprises applying a coating composition to the surface of a substrate or article to be coated, coalescing the coating composition to form a substantially continuous film and then curing the thus-obtained coating. The curing of these coatings can comprise a flash at ambient or elevated temperatures followed by a thermal bake. The method of forming a coating film uses the above described coating composition and, even when the baking temperature is relatively low, curing is possible. Curing can occur at ambient temperature of 20° C. to 175° C.

The coating compositions can be applied as a primer or primer surfacer, or as a topcoat, for example, a "monocoat". The coating compositions also can be advantageously employed as a topcoat in a multi-component composite coating composition. Such a multi-component composite coating composition generally comprises a base coat deposited from a film-forming composition and a topcoat applied over the base coat, the topcoat being deposited from a coating composition as described above. In certain embodiments, the multi-component composite coating composition is a color-plus-clear system where the basecoat is deposited from a pigmented film-forming coating composition and the topcoat is deposited from a coating composition which is substantially pigment-free, i.e., a clear coat. In certain embodiments, a coating composition described herein is used to deposit one or more of the coating layers deposited in the processes disclosed in United States Patent Application Publication No. 2004-0159555 and/or U.S. patent application Ser. No. 11/845,324, both of which being incorporated herein by reference. In certain embodiments, a coating composition as described herein is used to deposit one or more of the coating layers deposited in a "wet-on-wet" coating process wherein two or more, sometimes three coating layers (such as primer, basecoat, and clearcoat), are deposited, and then all the coating layers are cured simultaneously.

The film-forming composition from which the base coat is deposited can be any of the compositions useful in coatings applications for example, in automotive applications where color-plus-clear systems are most often used. A film-forming composition conventionally comprises a resinous binder and a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, also can be used as the base coat composition.

The base coat film-forming compositions are typically applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate. The thermosetting water-borne coating composition may also contain a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings.

The antimicrobial coatings described herein have a wide variety of applications. For example, the coatings can be used to coat surfaces of common objects touched by people in everyday lives, such as doorknobs, children's toys, and the like. In certain embodiments, however, the coatings are particularly desirable for use on consumer electronics devices, such as, telephones, including cell phones and smart phones, personal digital assistants, personal computers, digital cameras, or the like.

Illustrating the invention are the following examples that are not to be considered as limiting the invention to their details. All parts and percentages in the examples, as well as throughout the specification, are by weight unless otherwise indicated.

EXAMPLES

Example 1

A quaternary ammonium ion terminated polycarbodiimide was made using the ingredients and amounts listed in Table 1.

TABLE 1

| Raw Materials | Parts by Weight |
|---|---|
| Charge #1 | |
| Desmodur W[1] | 51.6 |
| Phospholene oxide | 0.77 |
| Charge #2 | |
| Methylisobutyl Ketone | 31.36 |
| Charge #3 | |
| Dibutyltin dilaurate | 0.0047 |
| Ethylene glycol | 2.14 |
| Charge #4 | |
| Dibutyltin dilaurate | 0.0738 |
| Choline Bromide[2] | 10.77 |
| Charge #5 | |
| Dowanol PM | 40.6 |

[1]Desmodur W is methylene-bis-(4-cyclohexyldiisocyanate) from Bayer Materials Science, LLC.
[2]Choline bromide from TCI America.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and Charge #2 was added. Charge #3 was added over 15 min and the reaction mixture was held at 90-100° C. until the NCO equivalent weight stalled at about 1200 eq/g. Charge #4 was added and the mixture was held at 90-100° C. until IR spectroscopy showed the absence of the characteristic NCO band. MIBK was stripped off at >100 mm Hg and was dissolved in charge #5 at 95° C. A sample of the polycarbodiimide dispersion was placed in a 120° F. hot room for 4 weeks, and the resin remained liquid.

Example 2

A quaternary ammonium ion terminated polycarbodiimide was made using the ingredients and amounts listed in Table 2.

TABLE 2

| Raw Materials | Parts by Weight |
|---|---|
| Charge #1 | |
| Desmodur W[1] | 36.87 |
| Phospholene oxide | 0.55 |
| Charge #2 | |
| Methylisobutyl Ketone | 23.04 |
| Charge #3 | |
| Dibutyltin dilaurate | 0.0033 |
| Choline Iodide[2] | 20.69 |
| Charge #4 | |
| Dowanol PM | 46.09 |

[1]Desmodur W is methylene-bis-(4-cyclohexyldiisocyanate) from Bayer Materials Science, LLC.
[2]Choline Iodide from TCI America.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and dissolved in Charge #2. Charge #3 was added over 15 min and the reaction mixture was held at 90-100° C. until there is no characteristic NCO band by IR. MIBK was stripped off at >100 mm Hg and was dissolved in charge #5 at 95° C. A sample of the polycarbodiimide dispersion was placed in a 120° F. hot room for 4 weeks, and the resin remained liquid.

Example 3

A N,N-Dimethylethanolamine terminated polycarbodiimide was made using the ingredients and amounts listed in Table 3.

TABLE 3

| Raw Materials | Parts by Weight |
|---|---|
| Charge #1 | |
| Desmodur W[1] | 51.3 |
| Phospholene oxide | 0.77 |
| Charge #2 | |
| Methylisobutyl Ketone | 31.14 |
| Charge #3 | |
| Dibutyltin dilaurate | 0.0046 |
| Ethylene glycol | 2.09 |
| Charge #4 | |
| Dibutyltin dilaurate | 0.055 |
| N,N-Dimethylethanolamine | 5.661 |
| Charge #5 | |
| Dowanol PM | 45.80 |

[1]Desmodur W is methylene-bis-(4-cyclohexyldiisocyanate) from Bayer Materials Science, LLC.

Charge #1 was added to a 3-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured ~350 eq/g by titration. The temperature was then decreased to 95° C. and Charge #2 was added. Charge #3 was added over 15 min and the reaction mixture was held at 90-100° C. until the NCO equivalent weight stalled at about 1200 eq/g. Charge #4 was added and the mixture was held at 90-100° C. until IR spectroscopy showed the absence of the characteristic NCO band. MIBK was stripped off at >100 mm Hg and was dissolved in charge

5 at 95° C. A sample of the polycarbodiimide dispersion was placed in a 120° F. hot room for 4 weeks, and the resin remained liquid.

Example 4

A N,N-Dimethylethanolamine terminated polycarbodiimide was made using the ingredients and amounts listed in Table 4.

TABLE 4

| Raw Materials | Parts by Weight |
|---|---|
| Charge #1 | |
| Desmodur W[1] | 64.10 |
| Phospholene oxide | 0.96 |
| Charge #2 | |
| Methylisobutyl Ketone | 17.17 |
| Charge #3 | |
| Dibutyltin dilaurate | 0.0057 |
| N,N-Dimethylethanolamine | 13.73 |
| Charge #4 | |
| Methanol | 28.61 |

[1]Desmodur W is methylene-bis-(4-cyclohexyldiisocyanate) from Bayer Materials Science, LLC.

Charge #1 was added to a 1-liter, 4-necked flask equipped with a motor driven stainless steel stir blade, a water-cooled condenser, a nitrogen inlet, and a heating mantle with a thermometer connected through a temperature feedback control device. The contents of the flask were heated to 140° C. and held at that temperature until the isocyanate equivalent weight measured >350 eq/g by titration. The temperature was then decreased to 95° C. and dissolved in Charge #2. Charge #3 was added over 15 min and the reaction mixture was held at 90-100° C. until there is no characteristic NCO band by IR. MIBK was stripped off at >100 mm Hg and was dissolved in charge #5 at 95° C. A sample of the polycarbodiimide dispersion was placed in a 120° F. hot room for 4 weeks, and the resin remained liquid.

Example 5

This example describes the quaternization of a N,N-Dimethylethanolamine terminated polycarbodiimide using the ingredients and amounts listed in Table 5.

TABLE 5

| Raw Materials | Parts by Weight |
|---|---|
| Charge #1 | |
| Product of Example 4 | 42.24 |
| Charge #2 | |
| Potassium Carbonate | 8.87 |
| Charge #3 | |
| Methanol | 16.89 |
| Charge #4 | |
| Dodecylbromide[1] | 31.98 |

[1]Dodecylbromide was purchased from Sigma-Aldrich.

Charge #1 (71% solids in methanol) was added to a 500 mL, 4-necked flask equipped with a motor driven stainless steel stir blade, a water-cooled condenser, a nitrogen inlet, and a heating mantle with a thermometer connected through a temperature feedback control device. Charge #2-4 were added over 15 min and the reaction mixture was heated to 65-70° C. The resulting mixture was held at 65-70° C. until there is no Dodecylbromide by thin-layer chromatography (TLC). A sample of the polycarbodiimide dispersion was placed in a 120° F. hot room for 4 weeks, and the resin remained liquid.

Example 6

A pendant quaternary ammonium ion containing polycarbodiimide was made using the ingredients and amounts listed in Table 6.

TABLE 6

| Raw Materials | Parts by Weight |
|---|---|
| Charge #1 | |
| Product of Example 3 | 65.59 |
| Charge #2 | |
| Betaine Hydrochloride | 8.17 |
| Charge #3 | |
| Dowanol PM | 26.23 |

[1]Betaine Hydrochloride from Sigma-Aldrich.

Charge #1 (54% solids in Dowanol PM) was added to a 500-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no change of NCO signal by IR. Charge #3 was added as a diluent. A sample of the polycarbodiimide dispersion was placed in a 120° F. hot room for 4 weeks, and the resin remained liquid.

Example 7

A pendant quaternary ammonium ion polycarbodiimide was made using the ingredients and amounts listed in Table 7.

TABLE 7

| Raw Materials | Parts by Weight |
|---|---|
| Charge #1 | |
| Product of Example 4 | 64.37 |
| Charge #2 | |
| Betaine Hydrochloride | 9.88 |
| Charge #3 | |
| Dowanol PM | 25.74 |

[1]Betaine Hydrochloride from Sigma-Aldrich.

Charge #1 (53% solids in Dowanol PM) was added to a 500-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no change of NCO signal by IR. Charge #3 was added as a diluent. A sample of the polycarbodiimide dispersion was placed in a 120° F. hot room for 4 weeks, and the resin remained liquid.

Example 8

A pendant and terminal quaternary ammonium ion containing polycarbodiimide was made using the ingredients and amounts listed in Table 8.

TABLE 8

| Raw Materials | Parts by Weight |
|---|---|
| Charge #1 | |
| Product of Example 2 | 67.20 |
| Charge #2 | |
| Betaine Hydrochloride | 5.91 |
| Charge #3 | |
| Dowanol PM | 26.9 |

[1]Betaine Hydrochloride from Sigma-Aldrich.

Charge #1 (47% solids in Methanol) was added to a 250-mL, 4-necked flask equipped with a motor driven stainless steel stir blade, a water-cooled condenser, a nitrogen inlet, and a heating mantle with a thermometer connected through a temperature feedback control device. Charge #2 was added at room temperature and heated to 60° C. The contents were held at that temperature until no NCO signal by IR. Charge #3 was added as a diluent. A sample of the polycarbodiimide dispersion was placed in a 120° F. hot room for 4 weeks, and the resin remained liquid.

Whereas particular embodiments of this invention have been described above for purposes of illustration, it will be evident to those skilled in the art that numerous variations of the details of the present invention may be made without departing from the invention as defined in the appended claims.

We claim:

1. A polycarbodiimide comprising an unbranched backbone and terminal onium salt groups, wherein the terminal onium salt groups comprise a trialkyl onium group and a halogen counterion.

2. The polycarbodiimide of claim 1, wherein the polycarbodiimide has the structure:

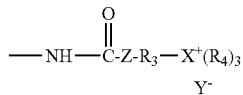

in which:
(a) each R is an unbranched, divalent linking group and each may be the same or different;
(b) $R_1$ is A when y is 1 and is the residue of an active hydrogen-containing chain extender when y is at least 2;
(c) n has a value of at least 2;
(d) y has a value of 1 to 4; and
(e) each A is represented by the structure:

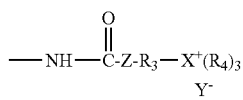

in which:
(1) each X is N or P and may be the same or different;
(2) each Y is a halogen and may be the same or different;
(3) each Z is O, NH, or S and may be the same or different;
(4) each $R_3$ is an unbranched, divalent linking group and may be the same or different; and
(5) each $R_4$ is a monovalent hydrocarbon group and may be the same or different.

3. The polycarbodiimide of claim 1, wherein the polycarbodiimide has the structure:

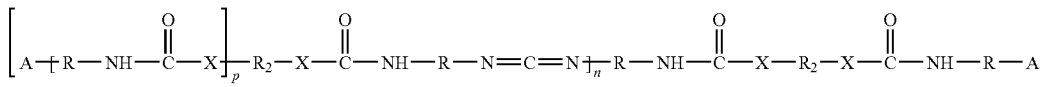

in which:
(a) each R is an unbranched, divalent linking group and each may be the same or different;
(b) each $R_2$ is an unbranched, linking group and may be the same or different;
(c) each X is O, NH, or S and may be the same or different;
(d) n has a value of at least 2;
(e) p has a value of 1 to 3; and
(f) each A is represented by the structure:

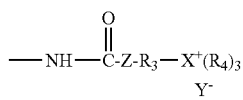

in which:
(1) each X is N or P and may be the same or different;
(2) each Y is a halogen and may be the same or different;
(3) each Z is O, NH, or S and may be the same or different;
(4) each $R_3$ is an unbranched, divalent linking group and may be the same or different; and
(5) each $R_4$ is a monovalent hydrocarbon group and may be the same or different.

4. The polycarbodiimide of claim 2, wherein y is 1.

5. The polycarbodiimide of claim 2, wherein n has a value of 2 to 10.

6. The polycarbodiimide of claim 3, wherein n has a value of 2 to 10.

7. The polycarbodiimide of claim 1, wherein the halogen counterion comprises a chlorine ion.

8. The polycarbodiimide of claim 1, wherein the trialkyl onium group comprises trimethylammonium.

9. The polycarbodiimide of claim 1, wherein the polycarbodiimide comprises a unit having the general structure:

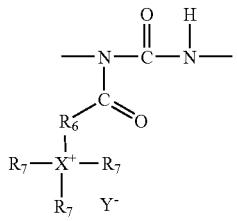

wherein:
(a) X is N or P;
(b) Y is an anion;
(c) $R_6$ is a divalent linking group; and
(d) each $R_7$ is a monovalent hydrocarbon group and may be the same or different.

10. The polycarbodiimide of claim 9, wherein X is N.

11. The polycarbodiimide of claim 9, wherein Y is a halogen.

12. A polycarbodiimide comprising an unbranched backbone and terminal trialkyl onium salt groups.

13. The polycarbodiimide of claim 12, wherein the polycarbodiimide comprises repeat units having the general structure:

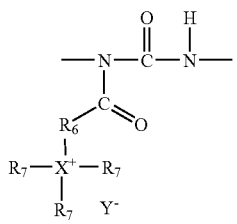

wherein:
(a) X is N or P;
(b) Y is an anion;
(c) $R_6$ is a divalent linking group; and
(d) each $R_7$ is a monovalent hydrocarbon group and may be the same or different.

14. The polycarbodiimide of claim 13, wherein X is N.

15. The polycarbodiimide of claim 13, wherein Y is a halogen.

16. The polycarbodiimide of claim 12, wherein the polycarbodiimide has the structure (VIII) or (IX):

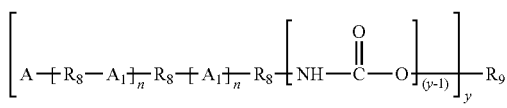
(VIII)

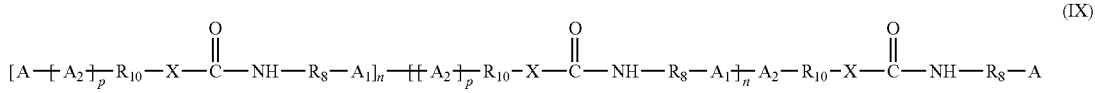
(IX)

in which:
(a) each $R_8$ is an unbranched, divalent linking group and each may be the same or different;

(b) $R_9$ is A when y is 1 and is the residue of an active hydrogen-containing chain extender when y is at least 2;
(c) each $R_{10}$ is an unbranched, linking group and may be the same or different;
(d) each X is O, NH, or S and may be the same or different;
(e) each n has a value of at least 1 and may be the same or different wherein at least one n has a value of at least 2;
(f) y has a value of 1 to 4;
(g) p has a value of 1 to 3;
(h) each A represents a terminal group;
(i) each $A_1$ represents a unit having the general structure (VIII) or a —N=C=N— unit; and
(j) each $A_2$ represents a unit having the structure:

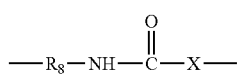

wherein $R_8$ is as defined above.

17. The polycarbodiimide of claim 16, wherein n has a value of 2 to 10.

18. The polycarbodiimide of claim 2, wherein the monovalent hydrocarbon group comprises one of a methyl group, an ethyl group, a propyl group, a isopropyl group, a iso-butyl group, a t-butyl group, a n-butyl group, a pentyl group, a hexyl group, a heptyl group, a octyl group, a nonyl group, a decyl group, and a dodecyl group.

19. The polycarbodiimide of claim 3, wherein the monovalent hydrocarbon group comprises one of a methyl group, an ethyl group, a propyl group, a isopropyl group, a iso-butyl group, a t-butyl group, a n-butyl group, a pentyl group, a hexyl group, a heptyl group, a octyl group, a nonyl group, a decyl group, and a dodecyl group.

20. The polycarbodiimide of claim 9, wherein the monovalent hydrocarbon group comprises one of a methyl group, an ethyl group, a propyl group, a isopropyl group, a iso-butyl group, a t-butyl group, a n-butyl group, a pentyl group, a hexyl group, a heptyl group, a octyl group, a nonyl group, a decyl group, and a dodecyl group.

* * * * *